United States Patent [19]
Ghislain et al.

[11] Patent Number: 5,981,609
[45] Date of Patent: Nov. 9, 1999

[54] PROCESS FOR THE PREPARATION OF POLYURETHANE FOAMS

[75] Inventors: Guy Jean Leon Ghislain, Everberg; Els Jeanne Francine Van Isterdael, Roosdaal, both of Belgium

[73] Assignee: Imperial Chemical Industries PLC, London, United Kingdom

[21] Appl. No.: 09/270,694

[22] Filed: Mar. 17, 1999

Related U.S. Application Data

[62] Division of application No. 08/897,193, Jul. 21, 1997, Pat. No. 5,889,071.

[30] Foreign Application Priority Data

Jul. 30, 1996 [BE] Belgium .............................. 96112252

[51] Int. Cl.⁶ .............................. C08G 18/14; C08K 3/00
[52] U.S. Cl. ........................ 521/50; 252/182.29; 521/163
[58] Field of Search .......................... 252/182.13, 182.29; 521/163

[56] References Cited

U.S. PATENT DOCUMENTS 4,935,460  6/1990  Cassidy et al. .......................... 521/163
5,132,040  7/1992  Randall et al. .......................... 521/163

*Primary Examiner*—Morton Foelak
*Attorney, Agent, or Firm*—Pillsbury Madison & Sutro Intellectual Property Group

[57] ABSTRACT

A process for the preparation of polyurethane foams by reacting a polyisocyanate composition with an isocyanate-reactive composition under foam-forming conditions, wherein the isocyanate-reactive composition comprises a monofunctional alcohol and an isocyanate-reactive cyclic urea.

3 Claims, No Drawings

PROCESS FOR THE PREPARATION OF POLYURETHANE FOAMS

This is a divisional application under 35 U.S.C. Section 120 of U.S. Ser. No. 08/897,193 filed on Jul. 21, 1997. Now U.S. Pat. No. 5,859,071

The present invention concerns a process for the preparation of polyurethane foams, particularly open celled semi-rigid polyurethane foams, foams thus obtained and isocyanate-reactive compositions useful for their preparation.

EP-A 599496 discloses polyol compositions comprising a polyol, an insoluble fluorinated compound and a surfactant which is the reaction product of a stoichiometric excess of a polyisocyanate and a polyalkylene glycol monoalkyl ether. Such polyol compositions are suitable for preparing open celled rigid foams by reacting them with a polyisocyanate composition in the presence of an isocyanate-reactive cyclic carbonate or cyclic urea, an inert insoluble fluorinated compound and a catalyst.

EP-A 498629 describes the use of isocyanate-reactive ureas as blowing promoter in the preparation of cellular polymeric products.

It has now been found that polyurethane foams, especially open celled semi-rigid polyurethane foams, having improved physical properties can be obtained from formulations containing an isocyanate-reactive cyclic urea and a monofunctional alcohol in the isocyanate-reactive component.

The present invention thus relates to a process for the preparation of polyurethane foams. in particular open celled semi-rigid polyurethane foams, by reacting a polyisocyanate composition with an isocyanate-reactive composition under foam-forming conditions, wherein the isocyanate-reactive composition comprises a monofunctional alcohol and an isocyanate-reactive cyclic urea of the formula:

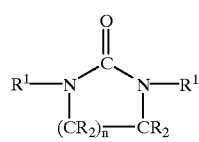

(1)

wherein each $R^1$, independently is a lower alkyl radical of $C_1$–$C_6$, or a lower alkyl radical substituted with an isocyanate-reactive group, and each R, independently is H, a lower alkyl radical of $C_1$–$C_6$ or —$(CH2)_m$—X wherein X is an isocyanate-reactive group which is OH or NH2, and m is 0,1 or 2; and wherein n is 1 or 2 with the proviso that at least one of $R^1$ or R is or comprises an isocyanate-reactive group.

Preferred are cyclic ureas of the formula

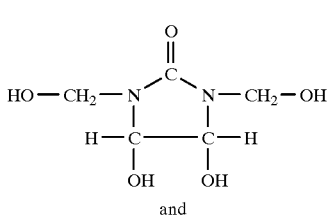

(2)

and

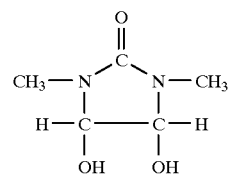

(3)

Organic polyisocyanates which may be used in preparing the polyurethane foams of the invention include aliphatic, cycloaliphatic, araliphatic and aromatic polyisocyanates, especially aromatic polyisocyanates such as tolylene and diphenylmethane diisocyanates in pure, modified or crude form. In particular MDI-variants containing urethane, allophanate, urea, biuret, carbodilmide or uretonimine residues, and mixtures of diphenylmethane diisocyanates and oligomers thereof commonly known as "crude" or "polymeric" MDI (polymethylene polyphenylene polyisocyanates) are useful. "Crude" MDI is preferred.

The isocyanate-reactive compounds useful in the process of the present invention include any of those known in the art for the preparation of rigid, semi-rigid or flexible foams.

Polyols or polyol mixtures used in the manufacture of flexible or semi-rigid foams generally have an average hydroxyl value of less than 350, preferably of from 20 to 200, and a functionality of from 2 to 6, preferably 2 to 4. Particular mention may be made of polyoxypropylene and poly(oxypropylene-oxyethylene) diols and triols, especially ethylene oxide capped polyoxypropylene diols and triols. If desired, polymer polyols formed by the polymerisation of one or more olefinic monomers in a polyether or polyester polyol may be used.

Still further suitable polyols include polyesters, hydroxyl terminated polythioethers, polyamides, polyesteramides, polycarbonates, polyacetals, polyolefins and polysiloxanes.

Polyols or polyol mixtures which are particularly useful in the preparation of rigid polyurethane foams are those having average hydroxyl values of from 300 to 1000, especially 300 to 700 mg KOH/g, and hydroxyl functionalities of from 2 to 8, especially 3 to 8. Suitable polyols include reaction products of alkylene oxides, for example ethylene and/or propylene oxide, with initiators containing from 2 to 8 active hydrogenatoms per molecule. Suitable initiators include: polyols, for example glycerol, trimethylolpropane, triethanolamine, pentaerythritol, sorbitol and sucrose; polyamines, for example ethylene diamine tolylene diamine diaminodiphenylmethane and polymethylene polyphenylene polyamines: and aminoalcohols, for example ethanolamine and diethanolamine; and mixtures of such initiators. Other suitable polymeric polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesterarmides, polycarbonates, polyacetals, polyolefins and polysiloxanes.

Any of the aforementioned polyols or mixtures thereof may be used in the process of the present invention, depending on the desired type of foam.

In the isocyanate-reactive composition low molecular weight isocyanate-reactive compounds may be present as well.

Suitable low molecular weight isocyanate-reactive compounds include polyols, polyamines, hydroxy-amino compounds, their imine-functional or enamine-containing derivatives and mixtures thereof having a molecular weight below 1000 and a functionality of 2 to 8.

Suitable low molecular weight polyols include diols such as ethylene glycol, propylene glycol, dipropylene glycol, tripropylene glycol and 1,4-butanediol.

Polyarmines having a low molecular weight include aliphatic, cycloaliphatic or araliphatic polyamines containing 2 or more primary and/or secondary amino groups, such as amino-ended polyethers and aromatic polyamines like DETDA.

Suitable low molecular weight hydroxy-amino compounds comprise monoethanolamine, diethanolamine, isopropanolamine and the like.

Suitable monofunctional alcohols for use in the present invention are polyalkylene glycol monoalkyl ethers of the formula R-A-OH, wherein R is $C_{1-25}$ alkyl and A is a polypropyleneoxy chain, optionally containing up to 25% polyethyleneoxy units, having a total length of from 4 to 39 units. Preferred polyalkylene glycol monoalkyl ethers are those wherein the sum of the length of the alkyl chain of R and the length of the polypropyleneoxy chain of A is between 5 and 40, preferably between 10 and 30 and most preferably between 20 and 30. Preferably A represents apolypropyleneoxy chain containing no polyethyleneoxy units.

Preferred polyalkylene glycol monoalkyl ethers are those of the formula R-A-OH wherein R is $C_{8-22}$ alkyl (which may be straight or branched) and A represents a polypropyleneoxy chain containing from 5 to 20 propyleneoxy units. Particular mention may be made of the polypropylene glycol monoalkyl ethers derived by propoxylation of stearyl alcohol, for example that containing an average of 10 propyleneoxy units, available from Imperial Chemical Industries PLC under the registered trade mark Arlamol E.

In addition to the polyisocyanate and isocyanate-reactive compositions, and the blowing agent, the foam-forming reaction mixture may also contain one or more other auxiliaries or additives conventional to formulations for the production of flexible, rigid or semi-rigid polyurethane foams.

Such optional additives include foam-stabilising agents or surfactants, for example siloxane-oxyalkylene copolymers, urethane catalysts, for example metal compounds or tertiary amines such as stannous octoate or triethylene diamine, and fire retardants, for example halogenated alkyl phosphates such as tris chloropropyl phosphate.

The amount of polyisocyanate used relative to the isocyanate-reactive compounds is usually such as to provide an isocyanate index between 30 and 300, preferably between 40 and 250, and most preferably between 50 and 150.

In operating the process for making foams according to the present invention, the known one-shot, prepolymer or semi-prepolymer techniques may be used together with conventional mixing methods.

The process of the present invention may be used to prepare any type of polyurethane foam. It is particularly useful for the preparation of semi-rigid polyurethane foams. especially open-celled semi-rigid polyurethane foams.

The polyurethane foams of the present invention show improved sound insulation and absorption and can be used as shock and sound absorbing materials in automotive and building applications. They are particularly useful in the production of sound-absorbing building panels. e.g. laminated with gypsum boards.

In a further aspect, the invention also relates to isocyanate-reactive compositions comprising a monofunctional alcohol and an isocyanate-reactive cyclic urea of formula (1).

The monofunctional alcohol can be present in the isocyanate-reactive composition in amounts of from 5 to 95% by weight based on the isocyanate-reactive composition. Preferably, from 15 to 80% by weight based on the isocyanate-reactive composition of monofunctional alcohol is added to the isocyanate-reactive composition.

The isocyanate-reactive cyclic urea can be present in the isocyanate-reactive composition in amounts of from 0.05 to 40% by weight based on the isocyanate-reactive composition. Preferably, from 1 to 25% by weight based on the isocyanate-reactive composition of isocyanate-reactive cyclic urea is added to the isocyanate-reactive composition.

The invention is illustrated, but not limited by the following examples.

EXAMPLES

Polyurethane foams were prepared in a conventional manner by reacting the components in the amounts (given as parts by weight) as shown in the Table. Also the properties of the foams that were measured are given in the Table hereinafter.

TABLE

|  | 1 | 2 | Comp. 1 | Comp. 2 | Comp. 3 | Comp. 4 |
|---|---|---|---|---|---|---|
| Polyol A | 26.09 | 26.09 | 60 | 60 | 60 | 60 |
| Polyol B | 17.39 | 17.39 | 40 | 40 | 40 | 40 |
| Monofunctional alcohol | 56.52 | 56.52 | — | — | — | — |
| B8919 | — | — | — | 1.0 | 1.0 | — |
| B8433 | — | — | — | — | 2.0 | — |
| B8406 | 0.43 | 0.43 | — | — | — | 1.0 |
| LK221 | — | — | 0.5 | 0.5 | 0.5 | — |
| UAX6080 | — | 0.02 | — | — | — | — |
| Y10762 | — | — | — | — | — | 0.05 |
| Catalyst X | 2.4 | 2.4 | 0.73 | 0.5 | 0.3 | 2.4 |
| Catalyst Y | 1.5 | 1.5 | 1.0 | 1.5 | 2.5 | 1.5 |
| Catalyst Z | 0.25 | 0.25 | 0.1 | 0.1 | 0.1 | 0.25 |
| Cyclic urea | 3.91 | 3.91 | 9.0 | 3.0 | 1.5 | 9.0 |
| MEG | 1.74 | 1.74 | 4.0 | 4.0 | 4.0 | 4.0 |
| Polyisocyanate | 98.33 | 98.33 | 149.2 | 90.7 | 75.6 | 194.33 |
| Water | 0.87 | 0.87 | — | — | — | 2.0 |
| dynamic stiffness (MPa/m) | 61.2 | 54.8 | 102.6 | 117.7 | 121.1 | 91.3 |
| air flow resistivity (MNs/m$^4$) | 0.140 | 0.168 | 18.0 | 30.5 | 25.5 | 1.127 |
| $\alpha_{50\,Hz}^{50\,mm}$ | 0.412 | 0.409 | 0.163 | 0.046 | 0.036 | 0.214 |
| $\alpha_{1000\,Hz}^{50\,mm}$ | 0.512 | 0.577 | 0.301 | 0.117 | 0.078 | 0.289 |

α = absorption coefficient perpendicular to sound incidence: measured according to ASTM E-1050-86

Dynamic stiffness was measured according to ISO 9052-1: 1989 and air flow resistivity according to ISO 9053: 1991.

Polyol A: sucrose/DEG initiated polyether polyol of hydroxyl value 155

Polyol B: oxyethylene/oxypropylene diol comprising 12% oxyethylene groups as end-groups and having 64% primary hydroxyl-groups (hydroxyl value=55)

Monofunctional alcohol: propoxylated stearyl alcohol containing an average of 10 propyleneoxy units (Arlamol E: available from Imperial Chemical Industries PLC)

B8919: silicone surfactant available from Th. Goldschmidt

B8433: silicone surfactant available from Th. Goldschmidt

B8406: silicone surfactant available from Th. Goldschmidt

LK221: silicone surfactant available from Air Products
UAX6080: silicone surfactant available from OSI
Y10762: silicone surfactant available from OSI
Catalyst X: Potassium catalyst available from Imperial Chemical Industries PLC
Catalyst Y: N,N dimethyl benzylamine
Catalyst Z: Niax A1 (amine catalyst available from Union Carbide)
Cyclic urea: Fixapret NF (available from BASF AG)
MEG: monoethylene glycol
Polyisocyanate: Suprasec DNR (NCO value 30.7; functionality 2.7), available from Imperial Chemical Industries PLC (Suprasec is a trade mark of Imperial Chemical Industries PLC)

Foams according to the invention have a significantly lower dynamic stiffness and air flow resistivity and a higher absorption coefficient than foams made from formulations not containing a monofunctional alcohol.

We claim:

1. An isocyanate reactive composition comprising a monofunctional alcohol and an isocyanate-reactive cyclic urea of the formula

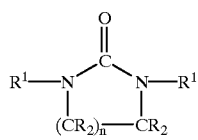

wherein each $R^1$, independently is a lower alkyl radical of $C_1$–$C_6$, or a lower alkyl radical substituted with an isocyanate-reactive group, and each R, independently is H, a lower alkyl radical of $C_1$–$C_6$ or —$(CH2)_m$—X wherein X is an isocyanate-reactive group which is OH or NH2, and m is 0.1 or 2: and wherein n is 1 or 2 with the proviso that at least one of $R^1$ or R is or comprises an isocyanate-reactive group.

2. An isocyanate-reactive composition according to claim 1 wherein the amount of the isocyanate-reactive cyclic urea is from 1 to 25% by weight of the isocyanate-reactive composition.

3. An isocyanate-reactive composition according to claim 1 wherein the amount of the monofunctional alcohol is from 15 to 80 by weight of the isocyanate-reactive composition.

* * * * *